United States Patent [19]

Spendlove

[11] 4,004,322
[45] Jan. 25, 1977

[54] ASEPTIC SERUM COLLECTION METHOD
[75] Inventor: Rex S. Spendlove, Logan, Utah
[73] Assignee: Spendlove Laboratories, Logan, Utah
[22] Filed: Dec. 17, 1975
[21] Appl. No.: 641,391
[52] U.S. Cl. .................................................. 17/51
[51] Int. Cl.² ...................................... A22C 21/04
[58] Field of Search ................ 17/51, 1 C; 128/347
[56] References Cited
UNITED STATES PATENTS

| 1,428,672 | 9/1922 | Wilson | 17/1 C |
| 3,649,996 | 3/1972 | Marti | 17/1 C |
| 3,947,919 | 4/1976 | Ekdahl | 17/1 C |

Primary Examiner—G.E. McNeill
Attorney, Agent, or Firm—H. Ross Workman; J. Winslow Young

[57] ABSTRACT

A method for aseptically collecting blood from an animal carcass, preferably, a fetus. The method includes pooling blood from the placenta and umbilical cord into the cardiovascular system of the fetus and thereafter draining the blood from the fetus. The heart is exposed and the fetus is suspended with the exposed heart at a low point of the fetus torso. The heart is aseptically cannulated and the blood drained into an aseptic collection bag. Manipulation of the suspended fetus carcass stimulates the flow of blood.

7 Claims, 2 Drawing Figures

ASEPTIC SERUM COLLECTION METHOD

BACKGROUND

1. Field of the Invention

This invention relates to a method for the aseptic collection of blood from an animal carcass.

2. The Prior Art

Blood serum is the clear liquid which is separated from the clot and cellular elements of the blood. Fetal bovine serum is known for its embryonic protein constituents which stimulate cell attachment and growth and, therefore, used extensively as a supplement to nutrient media used in mammalian cell culture. One use of such cultures is the production of viral vaccines. In addition, for an as yet unexplained reason, antibodies which tend to interfere with virus cultures are less likely to pass through the placenta of the bovine host into its fetus.

Recently, scientists have found that many live virus vaccines were contaminated with bacteriophages or phages (viruses that infect bacteria). Phages are introduced with the host bacteria that contaminate the fetal bovine serum which is, historically, collected in the extremely contaminated atmosphere of slaughterhouse. Contamination as high as $10^8$ bacteria per milliliter of serum has been found in serum so collected. Millipore filtration of the serum is used to remove these bacteria from the serum but phages pass through the filter and remain in the serum.

The effects of the presence of phages in the serum have not been completely determined although it is believed by some that certain phages may routinely infect human cells and cause diseases. Accordingly, there is considerable concern developing with respect to its presence in live virus vaccines. For example, see "Phage in Live Virus Vaccines: Are They Harmful to People?", *Science*, Volume 187, pages 522, 523 (Feb. 14, 1975).

Chemical contaminants present in the body fluids and any chemical sterilants may inadvertently enter the blood during collection. These chemical contaminants readily pass with the serum through the filter and are present in the serum when the serum is ultimately used as a nutrient medium for live virus vaccines.

Bovine fetuses are readily and abundantly available in most slaughterhouse operations and the fetus is commonly referred to in the jargon of the slaughterhouse as the "slunk". During the slaughter operation, the slunk is diverted to a collection area on or adjacent the slaughtering or kill floor for fetal blood collection. At the collection site a technician collects the fetal blood according to various conventional techniques.

Historically, the technician severs the umbilical cord near its midpoint and places both of the severed ends in the open mouth of a collection bottle. Fetal blood from both the placenta and the fetus is drained into the bottle by the technician "milking" both lengths of umbilical cord. This method resulted in (1) low volumes of collected blood and (2) exposure of the blood to contamination from (a) the atmosphere of the slaughtering operation, (b) chemicals in the body fluids on the umbilical cord and any chemical sterilants used on the umbilical cord and (c) fetal wastes (feces and urine) in the umbilical cord.

A recent advancement in fetal blood collection apparatus incorporates a closed loop vacuum collection system wherein an evacuated, rigid collection bottle serves as the suction source for a hollow needle connected to the bottle by a length of tubing. The needle is first inserted into the fetal cardiovascular system and then connected to the vacuum bottle. This system is readily susceptible to obstruction by clot formation and/or tissue fragments in the small diameter lumen of the needle and connective tubing. Obstructions are customarily cleared by withdrawing the needle to permit the vacuum to suck it through the system into the bottle. After the system is cleared, the needle is reinserted for continued aspiration of blood.

Removal of the needle permits exposure of the needle to bacterial contaminants in the extremely contaminated atmosphere of the slaughterhouse and to chemical contaminants in the normal fetal environment and any chemical sterilants present on the surfaces adjacent the puncture site. Reinsertion of the needle results in the consequent inoculation of the cardiovascular system with these contaminants. Additionally, aspiration of slaughterhouse atmosphere significantly increases the opportunities for bacterial contamination of the collected blood.

In view of the foregoing, what is needed is an aseptic blood collection technique which eliminates the difficulties and problems inherent in both the severed umbilical cord collection technique and the closed loop vacuum collection system. The improved collection system should (1) utilize gravity flow collection to eliminate the need for a vacuum system; (2) collect blood available in both the placenta and the fetus cardiovascular system; (3) accommodate fetus manipulation to stimulate additional blood drainage; and (4) provide for aseptic collection of the fetal blood. The gravity system should also accommodate collection of the blood into flexible bags which permit blood clot manipulation to release serum entrapped in the clot. Such a system is disclosed and claimed herein.

BRIEF SUMMARY AND OBJECTS OF THE INVENTION

This invention is a novel method for aseptically draining a maximal quantity of blood from an animal fetus. The method includes suspending the fetus with its heart at a low point of the torso to permit blood from the placenta and umbilical cord to be aseptically pooled and collected with blood from the fetal cardiovascular system.

Aseptic blood collection is enhanced by searing a portion of the fetus heart surface to (1) kill surface microorganisms and (2) dry the heart surface to reduce surface moisture and any chemical contaminants therein.

It is therefore a primary object of this invention to provide improvements in the aseptic collection of blood from an animal carcass.

Another object of this invention is to provide a method whereby increased quantities of blood may be drained from an animal carcass.

Another object of this invention is to provide a method for increasing the quantities of serum obtained from the blood collected from an animal carcass.

An even still further object of this invention is to provide a method for aseptically collecting blood directly from the heart of an animal carcass.

These and other objects and features of the present invention will become more fully apparent from the following description and appended claims taken in conjunction with the accompanying drawing.

DETAILED DESCRIPTION OF THE PREFERRED EMBODIMENTS

Figure 1:
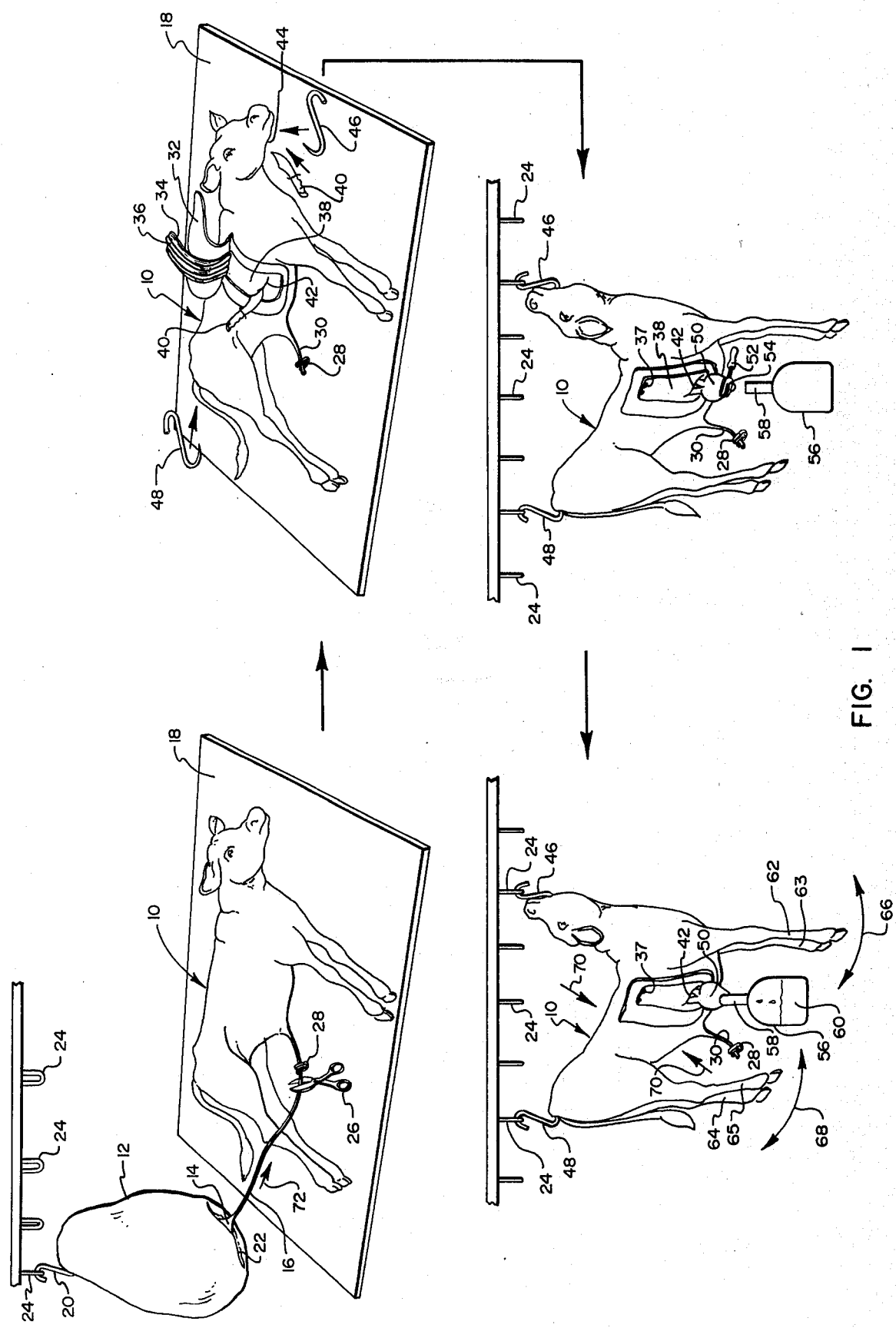
FIG. 1 is a schematic representation of the method of this invention for aseptically draining blood from an animal fetus.

The invention is best understood by reference to the drawing wherein like parts are designated with like numerals throughout.

Although the method of this invention is readily adapted to the collection of blood from practically any mammalian carcass, for ease of illustration, only the fetus obtained from a cattle slaughtering operation is referred to in detail.

Referring now to FIG. 1, a fetus 10 is removed from its uterus 12 through a cut 22. Fetus 10 remains attached to its placenta 14 through an umbilical cord 16. Fetus 10 is placed on its left side on a table 18 and uterus 12 is suspended above fetus 10 by a hook 20 which engages a ring 24. Suspension of uterus 12 permits drainage of residual blood in placenta 14 through umbilical cord 16 into fetus 10. Manipulation or "milking" of umbilical cord 16, as indicated by directional arrow 72, further facilitates the drainage of blood from placenta 14 into fetus 10. Umbilical cord 16 is then clamped with a clamp 28 and severed as indicated by scissors 26. Uterus 12, placenta 14 and remaining umbilical cord 16 are returned to the entrails processing system of the slaughterhouse.

During and subsequent to the suspension and drainage of placenta 12, fetus 10 is prepared for blood collection. Initially, a flap of hide 32 is removed from the right side of the chest cavity and the chest cavity opened as indicated by a flap of flesh 34. In particular, a knife 40 is inserted between two ribs adjacent the heart and a cut is made parallel to the ribs through the intercostal muscles until reaching the costal cartilage that connects the ribs to the sternum. The knife cut is continued along the costal cartilage until the desired number of ribs (usually two to four) have been severed from the sternum. The cut is then extended dorsally between the ribs to a point opposite the entry and the ribs 36 lifted away from the chest cavity. Selectively, the ribs 36 may then be cut away with flesh 34 leaving stubs 37. Hide 32 may also be cut away.

In the illustrated embodiment two ribs, ribs 36, have been removed in order to facilitate lowering heart 50 through the resulting opening. Additional ribs may be removed although it is desirable not to remove too many ribs since this permits the liver (not shown) and lungs (not shown) to also fall through the resulting opening. Removal of ribs 36 and flesh 34 exposes the myocardial membrane 38 which is cut at 42 with knife 40. Cutting the myocardial membrane permits heart 50 to be pulled through cut 42 to expose heart 50 for further processing.

Fetus 10 is anteriorily suspended by cutting the lower jaw 44 as indicated by knife 40 and inserting a hook 46 therein. Posterioriy, fetus 10 is suspended by inserting a second hook 48 into the rectum. Hooks 46 and 48 are engaged with rings 24 to suspend anterior and posterior ends, respectively, of fetus 10. The distance between hooks 46 and 48 is selectively determined in order to have the heart 50 hang at a low point of the major bulk of the torso of fetus 10.

The exposed heart 50 is suitably manipulated in order to stimulate blood circulation. This stimulation of blood circulation results in a more rapid initial blood flow and a more complete drainage of the blood upon cannulation.

Prior to cannulation, heart 50 is wiped dry and a hot iron 52 is placed against the side of heart 50 to further dry and to sear a portion of the heart surface. At this point, it should be noted that heart 50 may be cannulated either while fetus 10 is on table 18 or while suspended by hooks 46 and 48.

Heat searing of the cannulation site on heart 50 is the preferred method of achieving a degree of sterilization since the heat not only kills most microorganisms almost instantaneously but also dries the heart surface to reduce contamination by chemicals in body fluids on the heart surface. Additionally, the seared surface is more difficult to subsequently wet by these fluids. Chemical sterilants can be used to sterilize heart 50 but are not preferred because most known and conventional chemical sterilants are not instantaneous in their bacteriocidal action on microorganisms. Chemical sterilants also leave a residue which forms a second source of possible chemical contamination of the collected blood and serum.

Hot iron 52 is placed against heart 50 with an upper portion of hot iron 52 transverse to the direction of body fluids draining along the surface of heart 50. In this manner, a beveled cutout 54 of hot iron 52 and the underlying cannulation site are both effectively isolated from runoff and the contaminants in these body fluids.

Heart 50 is cannulated at the seared portion with a conventional large diameter cannula (not shown). The cannula (not shown) may be fabricated from metal or a sufficiently rigid plastic so as to (1) support a sharpened point and (2) accommodate tearing of the heart chambers upon rotation of the tip in the heart. The cannula (not shown) is connected to collection bag 56 and aseptically isolated in a cover 58.

Cover 58 is fabricated from a flexible plastic or may be fabricated as a slidable sleeve so as to aseptically isolate the cannula (not shown). The end of cover 58 may be penetrated or easily burned away by pressing it against hot iron 52 while hot iron 52 is held against heart 50. Crushing cover 58 against heart 50 permits penetration of heart 50 with the cannula (not shown) isolated therein.

After cannulation, the internal chamber walls of heart 50 are torn and cut by revolving the sharpened tip (not shown) of the cannula (not shown) thereby permitting a greater volume of blood to be collected through heart 50. Heart 50 is preferably cannulated at the side adjacent the apex where the wall is thinner and the inner chambers of the heart are more readily accessible to the tearing action of the arcuately rotated cannula tip. During these cannulation and heart chamber tearing steps with the cannula, care should be exercised to prevent the cannula from being withdrawn and reinserted since cannula withdrawal immediately exposes the cannula to possible contamination while subsequent reinsertion inoculates the heart with the acquired contaminants.

Preferably, collection bag 56 is flexible and is attached directly to the cannula (not shown) in order to reduce the distance the blood must be aseptically conveyed and to significantly reduce the chances for clot formation and obstruction of the cannula. A flexible collection bag 56 has a further advantage in that it is initially available in the collapsed state and as such there is no venting requirement when the bag 56 fills with blood 60. Otherwise, there would be an air interchange between the bag and the atmosphere thereby providing a possible avenue for contaminant entry into the bag.

Clearly, the sequential steps of heart sterilization and cannulation could precede the suspending of the fetus. However, the preferred procedure is to suspend the fetus 10 prior to the aforesaid steps to reduce opportunities for accidental dislodgment and resulting exposure to contamination of the collection apparatus.

Collection bag 56 is suspended from heart 50 by any suitable technique. The blood 60 is allowed to flow therein under the action of gravity. If collection bag 56 fills with blood 60 before all the blood has been drained from fetus 10, heart 50 may be again sterilized and cannulated at a second location and collection continued in a second blood collection bag.

Additional quantities of blood may be collected in collection bag 56 by suitably manipulating the front legs 62 and rear legs 64 as indicated by arrows 66 and 68, respectively. Furthermore, the fetus carcass may also be suitably manipulated as indicated generally by arrows 70, for example, by being squeezed against a wall (not shown) or by any other suitable technique. After the blood 60 has been suitably collected within collection bag 56, the collection bag 56 is aseptically closed off (not shown) within cover 58 and the blood therein subjected to further processing.

Figure 2:
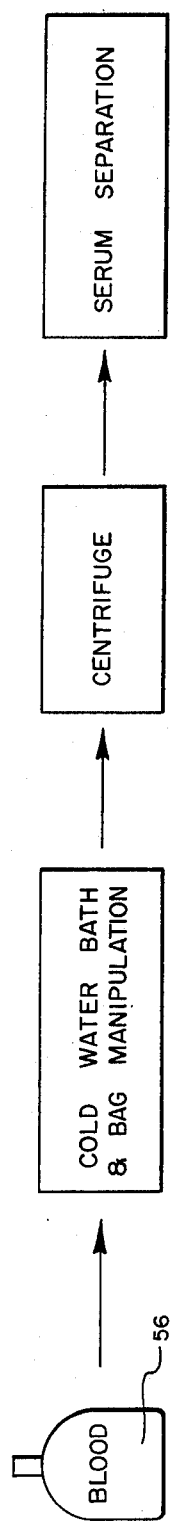
FIG. 2 is a flow diagram for separating serum from the aseptically collected blood.

Referring now more particularly to FIG. 2, the sealed collection bag 56 is immediately placed into a cold water bath and chilled. The blood clot that forms in the blood 60 is suitably manipulated through the flexible walls of bag 56 in order to break up the clot to obtain a more rapid clot contraction and, correspondingly, obtain a more complete serum extraction from the blood. Furthermore, clot reduction minimizes adherence of the clot fibrin to the internal walls of collection bag 56 during the following conventional centrifugation step to more readily segregate the serum from the remaining blood components.

The serum is subjected to additional processing according to conventional techniques.

The aseptically collected serum obtained by practicing the novel method of this invention is surprisingly free of essentially all contaminants including bacteria, bacteriophage, fetal waste products and chemicals. Accordingly, it is a very desirable product and has a greatly enhanced marketability.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for aseptically collecting blood from an animal fetus comprising the steps:
   obtaining an animal fetus;
   exposing the heart of the fetus;
   suspending the animal fetus so that the heart is lower than a substantial portion of the fetus;
   treating a portion of the heart surface to kill contaminating microorganisms;
   cannulating the heart through the treated portion with an aseptic cannula; and
   draining blood from the fetus through the cannula into an aseptic collection reservoir.

2. A method as defined in claim 1 wherein the obtaining step further comprises obtaining a fetus with a placenta attached thereto by an umbilical cord and draining blood from the placenta into the fetus.

3. A method as defined in claim 1 wherein the treating step comprises searing the portion of the heart with heat.

4. A method as defined in claim 1 wherein the cannulating step includes tearing the inner chambers of the heart with the cannula by arcuately moving the tip of the cannula in the heart.

5. A method for aseptic blood serum collection comprising the steps of:
   obtaining an animal fetus, the fetus having the placenta attached thereto;
   draining blood from the placenta into the fetus;
   exposing the heart of the fetus;
   suspending the fetus with the heart at a low point of the torso;
   treating an entry area to the heart by searing a portion of the surface of the heart to kill contaminating microorganisms;
   penetrating the seared portion of the heart with an aseptic cannula;
   draining blood from the fetus through the cannula into an aseptic container;
   chilling the blood in the container; and
   separating serum from the blood.

6. A method as defined in claim 5 wherein the chilling step includes manipulating the clot that forms in the blood thereby liberating additional quantities of serum.

7. A method as defined in claim 5 wherein the penetrating step includes isolating the penetration site with the hot iron to prevent contaminants of the cannula during the penetrating step.

* * * * *